Patented Oct. 4, 1938

2,132,352

UNITED STATES PATENT OFFICE 2,132,352

NITROALCOHOLS

Henry B. Hass, West Lafayette, and Byron M. Vanderbilt, Terre Haute, Ind., assignors to Purdue Research Foundation, La Fayette, Ind., a corporation of Indiana No Drawing. Application June 25, 1937, Serial No. 150,310

3 Claims. (Cl. 260—632)

Our invention relates to new and useful aliphatic nitroalcohols, and, more particularly to the nitroalcohols having the following general structural formula:

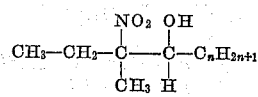

in which $n$ represents zero or 1.

The specific nitroalcohols included in our present invention are:

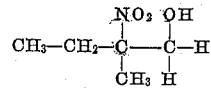

2-nitro-2-methyl-1-butanol

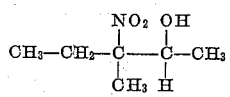

3-nitro-3-methyl-2-pentanol

These nitroalcohols may suitably be prepared by previously known methods for introducing the nitro group into an aliphatic compound, as for example, by reacting silver nitrite with 2-iodo-2-methyl-1-butanol or 3-iodo-3-methyl-2-pentanol. However, we prefer to prepare these compounds in accordance with the process of co-pending application Ser. No. 146,855 of Byron M. Vanderbilt, filed June 7, 1937. According to this process, a primary or secondary nitroparaffin and an aliphatic aldehyde are reacted in the presence of an auxiliary solvent, such as ethyl alcohol, and in the presence of an alkaline catalyst such as sodium hydroxide, the aldehyde being slowly added to a solution of the nitroparaffin and catalyst in the auxiliary solvent while thoroughly agitating.

The nitroalcohols prepared by the above procedures may be purified according to any of the known means as, for example, by treating with sodium bisulphite to remove aldehydes or aldehyde condensation products. We prefer, however, to purify these nitroalcohols by aerating the impure compounds for one to three hours at elevated temperature, e. g. 70 to 100° C. The nitroalcohol is subsequently distilled from the resulting polymerized products. The resulting nitroalcohol may exist as a mixture of its stereoisomers. These may be separated further by fractional distillation, fractional crystallization, or other suitable means, depending on the particular compound and the particular nature of isomerism involved. The stereoisomers of 2-nitro-2-methyl-1-butanol can not be separated by physical methods since only one asymmetric carbon atom is present in the molecule.

The following examples illustrate suitable procedures for the preparation of the two compounds specified above:

Example I

A solution of 51.5 parts by weight of 2-nitrobutane, 10.3 parts of 1 N sodium hydroxide and 8 parts of absolute ethyl alcohol was prepared, and to this solution was slowly added with thorough agitation 44.5 parts of formalin (39% HCHO). The temperature was maintained at approximately 30° C. during this addition, and the mixture was then allowed to stand at this temperature for a period of three days without further agitation. At the conclusion of this period the sodium hydroxide was neutralized with an exact equivalent of hydrochloric acid, and the mixture was distilled under reduced pressure. The resulting distillate was somewhat yellow in color and was therefore subjected to aeration at 90° C. for a period of 2 hours. The material was then redistilled under vacuum giving a clear water-white distillate consisting of 2-nitro-2-methyl-1-butanol.

Example II

A solution of 309 parts by weight of 2-nitrobutane, 182 parts of 95% ethyl alcohol, and 10.3 parts of 10 N sodium hydroxide was prepared and to this solution was slowly added with thorough agitation 132 parts of acetaldehyde. The temperature was maintained at 30° C. during this addition, and the mixture was allowed to stand at this temperature for four days without further agitation. At the conclusion of this period the sodium hydroxide was neutralized with an exact equivalent of hydrochloric acid, and the mixture was distilled under reduced pressure. The distillate was somewhat yellow in color and was therefore subjected to aeration at 90° C. for 2 hours. The material was then redistilled under vacuum giving a clear water-white distillate consisting of 3-nitro-3-methyl-2-pentanol.

The nitroalcohols prepared as described above are somewhat viscous colorless liquids having a pleasant, somewhat ester-like odor. They are mixtures of their various possible stereoisomers and no attempt has been made to separate them into their components. These compounds are stable up to temperatures of 100° C. At a temperature of 150° C. the 3-nitro-3-methyl-2-pentanol decomposes relatively rapidly, whereas the 2-nitro-2-methyl-1-butanol may be heated at this temperature for from 3 to 4 hours without appreciable decomposition. These compounds are partially miscible with water, the 3-nitro-3-methyl-2-pentanol being soluble in water to the extent of approximately 5% at 25° C., and the 2-nitro-2-methyl-1-butanol being soluble to the extent of approximately 9%. At this temperature, water is soluble in 3-nitro-3-methyl-2-pentanol to the extent of approximately 10%, and in 2-nitro-2-methyl-1-butanol to the extent of approximately 17%.

The following physical properties were determined for the nitroalcohols prepared in the above examples:

| Property | 2-nitro-2-methyl-1-butanol | 3-nitro-3-methyl-2-pentanol |
|---|---|---|
| Boiling point at 10 mm | 98° C. | 100 to 101° C. |
| Specific gravity $D_4^{25}$ | 1.1047 | 1.1157 |
| Refractive index at 20° C | 1.4468 | 1.4518 |

It is to be understood that the above data were obtained from single preparations of each of the compounds and, while such data will be useful in identifying these compounds, we do not wish to limit ourselves to products having the exact constants listed. It is to be noted that, in general, mixtures of the stereoisomers are formed in our procedure and the different percentages of isomers in the mixture in certain cases may give rise to slightly different physical properties of the compound.

The nitroalcohols of the present invention are useful organic solvents and constitute satisfactory solvents for nitrocellulose. These materials can be utilized in any nitrocellulose composition requiring a high boiling solvent. These nitroalcohols are, likewise, useful as intermediates for the preparation of numerous organic compounds, and various other uses of these materials will be apparent to those skilled in the art.

Our invention now having been described, what we claim is:

1. A nitroalcohol of the formula:

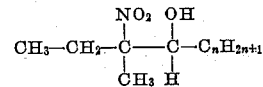

in which $n$ represents 0 or 1.

2. 2-nitro-2-methyl-1-butanol.
3. 3-nitro-3-methyl-2-pentanol.

HENRY B. HASS.
BYRON M. VANDERBILT.